Dec. 26, 1939.　　　D. R. HILLIS　　　2,184,778

REVERSIBLE MULTIPLE OUTLET FEEDER

Filed Oct. 19, 1936

INVENTOR.
David R. Hillis
BY
Ralph L. Enns
ATTORNEY.

Patented Dec. 26, 1939

2,184,778

UNITED STATES PATENT OFFICE 2,184,778

REVERSIBLE MULTIPLE OUTLET FEEDER

David R. Hillis, Detroit, Mich., assignor to Trabon Engineering Corporation, Cleveland, Ohio, a corporation of Ohio Application October 19, 1936, Serial No. 106,362

2 Claims. (Cl. 184—7)

My invention pertains to a fluid distributing feeder and more particularly to a feeder especially adapted for use in systems of the single-pipe line flow reversing type. Although my fluid distributing feeder may be utilized for the distribution of various fluids, it is especially useful for distributing lubricant from a lubricating system to the various bearings to be lubricated.

It is an object of my invention to provide a positive acting fluid discharging feeder comprising piston controlled check valves which restrict the initial flow of injected fluid from by-passing around the fluid responsive members and provide for the positive actuation of said members to disconnect the previously established connections and thereafter to open the check valve and permit the entrance of the fluid through the connections which will then be reestablished by the fluid responsive members.

The invention itself, however, both as to its construction and its method of operation together with additional objects and advantages thereof, will best be understood from the following description of specific embodiments, when read in conjunction with the accompanying drawing, where like reference characters indicate similar parts throughout, and in which.

Figure 1:
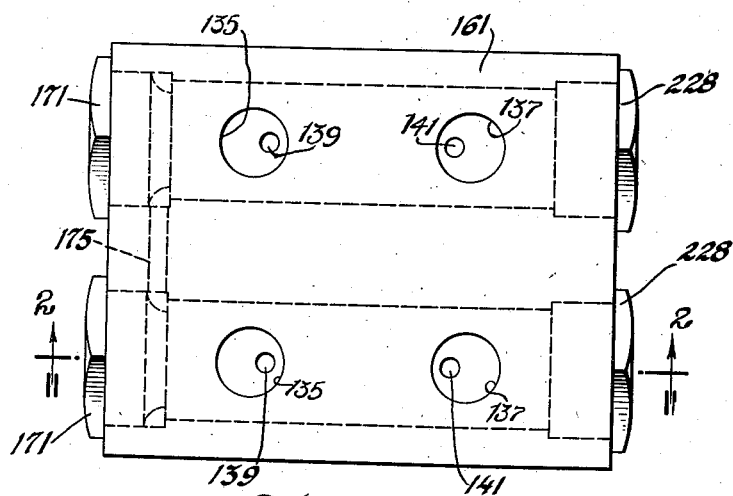
Fig. 1, is a top plan view of an embodiment of my feeder.

Referring to Fig. 1, there is disclosed a pair of feeders made in one body 161, disposed in parallel relationship, each feeder having a pair of discharge outlets 135 and 137.

In my U. S. Patent No. 2,143,733, issued January 10, 1939, I have disclosed a reversible operated feeder of this same type, said feeder having but one discharge outlet with a dual service port at each end.

In Fig. 1, I have shown how such feeders may be coupled together or made in one body by merely providing a connecting passage 175 between the two adjacent ends of the feeders, said passage acting as a dual service port for each feeder at said connected end, the end plugs 171 not being bored for dual service ports like end plugs 228.

Figure 2:
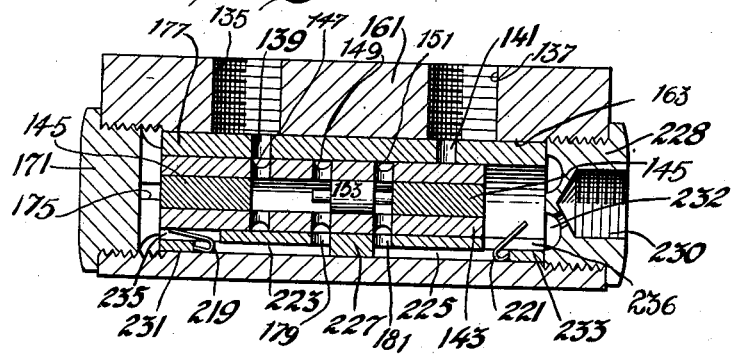
Fig. 2, is a sectional view on line 2—2 thereof, illustrating one form of my piston controlled check valve.

Referring now to Fig. 2, it will be seen that the body 161 of my feeder is provided with an aperture or orifice 163 extending therethrough. An enlarged counter-bore is provided in the body 161 at each end of the orifice 163 for receiving end nuts or plugs or fixture members 171 and 228 which are threadably engaged therein. In the present embodiment, the end fixture or plug 228 is provided with a service duct 230, and said plug is provided with internal threads for conveniently connecting the feeder into a distributing system.

A tubular guiding sleeve 177 is provided in the aperture 163 preferably of such a length that its ends are firmly engaged by the innermost ends of the end plugs for securing it in its proper position in the body. A pair of intermediate ports 179 and 181 penetrate the side walls of the guiding sleeve 177 at axially spaced positions near the middle of the sleeve. Conductive and by-passing connections are provided from each of said ports 179 and 181 to the adjacent end of the sleeve by respective grooves 223 and 225 extending therefrom and cut axially along the outer peripheral surface of the sleeve in any convenient manner. Conductive association is established from a pipe line to the interior of the feeder at the right through dual service port 238 and fluid conducting ducts 232 which are cut into the inner end plug 228. Conductive connection is established from port 175 with the interior of the feeder at the left through an annular groove around the interior of the plug 171, said plug being slotted to form a continuation of the said port 175.

Internal grooves 235 and 236 are provided in the respective ends of the guiding sleeve and they connect into the respective grooves 223 and 225 at spaced positions in the side walls of the guiding sleeve 177.

The outer ends of the conducting and by-passing grooves 223 and 225 in the guide sleeve are partially closed by arcuate cross bars 231 and 223 which engage the inner surface of the orifice in the body. Disposed in the fluid passage provided between the two grooves is the check valve member 219, a flat resilient steel or other metal, which is firmly anchored on the arcuate cross-bar 231 in any suitable manner, as by welding, for example. The opposite end of the sleeve is similarly arranged and either check valve member 219 or 221 tends to spring up to the position, as shown at the right hand end of Fig. 2. In this position, the check valve does not interfere with the flow of fluid which passes freely around it.

The top wall of the body is provided with two axially spaced discharge outlets 135 and 137, which are connected into the guide sleeve 177 through respective discharge ports 139 and 141 in the top walls thereof.

For controlling the flow of fluid between the service ports 230 and 175 and the discharge outlets 135 and 137 in the body, I provide fluid pressure responsive means slidably disposed within the guide sleeve 177 which comprises a hollow piston 143. The hollow piston 143 is preferably formed of a substantially tubular member 143 provided with plugs 145 for closing the ends thereof. For this purpose, the plugs 145 may be secured or pressed into the tubular piston in any suitable manner. Extending through the side walls of the hollow piston are three axially spaced ports 147, 149 and 151 which are adapted for conductive connection by pairs with the middle sleeve ports 179 and 181, as the piston slides between its two extreme positions in the aperture. Also the two remotely spaced piston ports 147 and 151 are adapted for connection selectively with one or the other of the discharge ports 139 or 141. The piston is thus connected between either service port and the remote discharge outlet in the body as it slides back and forth between two positions in the body. The middle piston port 149 comprises a by-pass port and it connects selectively with one or the other of the middle sleeve ports 179 or 181. The piston is provided with three external grooves cut circumferentially around and connecting from each one of the axially spaced ports 147, 149 and 151.

To control the connections through the hollow piston 143 and for discharging the fluid therefrom, I provide an auxiliary piston 153 which is slidably disposed within the hollow piston. The axial dimension of the auxiliary piston 153 is so selected that it is less than the distance between adjacent pairs of the three spaced ports in the piston. The auxiliary piston 153 is provided on opposite ends with axially projecting stop members which are of reduced cross-sectional area and which serve to stop the auxiliary piston 153 in either extreme position within the hollow piston 143 so that it does not obstruct the end ports 147 and 151 connecting therefrom.

Operation

In operation, assuming that fluid is injected into the service plug 230 on the righthand end of the body, it tends to push the hollow piston 143 to the left hand end of the piston guiding aperture in the guide sleeve 177, as shown in Fig. 2. Check valve 221 will be in its operative position, closing groove 236 at the start of this operation as hollow piston 143 would then be at its extreme right. As the piston 143 moves to its extreme left position, it establishes conductive connection between the left hand discharge port 139 in the guide sleeve and the end port 147 in the hollow piston while also establishing conductive connection between the right hand end port 151 in the piston and the right hand port 181 in the guide sleeve.

Having thus established the operative connections, the injected fluid passes through the port 230, thence passes through ducts 232 into sleeve 177 at its right, through internal groove 236, thence into and through the groove 225 and thence through the right hand one 181 of the middle ports in the sleeve into the right hand end of the hollow piston 143 by way of the piston port 151. As the fluid enters the right hand end of the hollow piston, it drives the auxiliary piston 153 towards the left, thus discharging fluid therefrom into the discharge port 139 and out the discharge outlet 135 of the body.

As the auxiliary piston 153 completes its stroke, it opens a connection through the middle or by-pass port 149 of the hollow piston which is connected with the middle port 179 in the guide sleeve. The injected fluid is now by-passed freely through the feeder passing through the axial groove 223 in the sleeve, passed check valve 219, into groove 235 thence through the annular groove around plug 171 and through its slots and out of port 175. The fluid thus by-passes freely through the feeder to the next fluid distributing feeder or to the source.

When the slidable piston 143 approaches the left hand position, it engages the resilient check valve member 219 and pushes it downwardly into the internal groove 235 which extends to the end of the guide sleeve 227, in a manner clearly shown at the left hand end of the piston shown in Fig. 2. In this position, the resilient check valve spring 219 restricts the entrance of fluid therein when flowing from the left, because it is of substantially the same width as the internal groove 235 in which it is pressed by the piston 143. Fluid tending to enter the internal groove 235 merely presses the check valve 219 against the piston and thus seats it more firmly. However, fluid may escape freely in the opposite direction by flowing from the groove 223 and passing through the internal groove 235 between the piston 143 and the valve spring 219 and thereby pushing the spring away from the piston and opening the passageway. At the opposite end of the piston the resilient check valve 221 cooperates in a similar manner.

In the operation of this embodiment of my device, assuming that fluid pressure is applied from the left hand end of the aperture, the check valve 219 prevents it passing through the previously connected by-passing connections and a pressure is built up which positively pushes the piston to the right hand end of the aperture. As soon as the piston has moved a short distance, the check valve 219 springs up and is released, but by this time the previously established by-passing connections have been interrupted. Consequently the movement of the piston is positively continued until it reestablishes the new connections, thus the device is caused to respond positively irrespective whether a thin or low pressure fluid is used or the device is mounted in a vertical position. In this embodiment of my device, the hollow ported piston and the auxiliary piston operate in a manner similar to that previously described and it will not be repeated.

It will thus be seen that I have provided an improved positive-acting fluid distributing feeder which is of simple, rugged construction and which may be adapted to successively feed a plurality of discharge outlets in a single-line flow reversing system.

Aside from the specific embodiment of the invention, as already shown and described, it will be understood that numerous details of the construction and arrangement disclosed may be altered or omitted without departing from the spirit and scope of the invention as disclosed and claimed, and that I do not desire to limit the invention to the exact construction herein set forth.

I claim:

1. In combination in a fluid distributing feeder, a body having an aperture therein, a piston guide sleeve in said aperture, ports penetrating the side walls of said sleeve, a hollow ported piston slidably disposed in said sleeve for making ported connections therethrough, end fixtures on said body for closing the ends of said apertures to define fluid receiving compartments, a service port connected into each said compartment, discharge port means in said body, conduits for connecting respective sleeve ports with said discharge port means, a groove cut in the outer peripheral surface of said sleeve to the end thereof from the respective sleeve ports to define a fluid conduit connecting from each one of said compartments to one of said ports in the sleeve, and movable means in the outer end of each groove for engaging the adjacent end of the piston in its outermost position to cooperatively provide a check valve restricting the entrance of fluid into said groove when fluid pressure is applied in the adjacent compartment, whereby the positive actuation of the piston is obtained.

2. In combination in a fluid distributing feeder, a body having an aperture therein, a piston guide sleeve in said aperture, ports penetrating the side walls of said sleeve, a hollow ported piston slidably disposed in said sleeve for making ported connections therethrough, end fixtures on said body for closing the ends of said apertures to define fluid receiving compartments, a service port connected into each said compartment, discharge port means in said body, conduit means for connecting respective sleeve ports with said discharge port means, a groove cut in the outer peripheral surface of said sleeve to each end thereof from respective ones of said sleeve ports to define a fluid conduit connecting from each one of said compartments to one of said ports in the sleeve, and a substantially flat resilient member fitting snugly in the outer end of each groove for engaging the side wall of the piston adjacent the end thereof in its outermost position to cooperatively provide a check valve restricting the entrance of fluid into said groove when fluid pressure is applied in the adjacent compartment, whereby the positive actuation of the piston is obtained.

DAVID R. HILLIS.